No. 684,638. Patented Oct. 15, 1901.
T. R. HAZZARD.
TRUCK BRAKE.
(Application filed Aug. 15, 1901.)
(No Model.) 2 Sheets—Sheet 2.
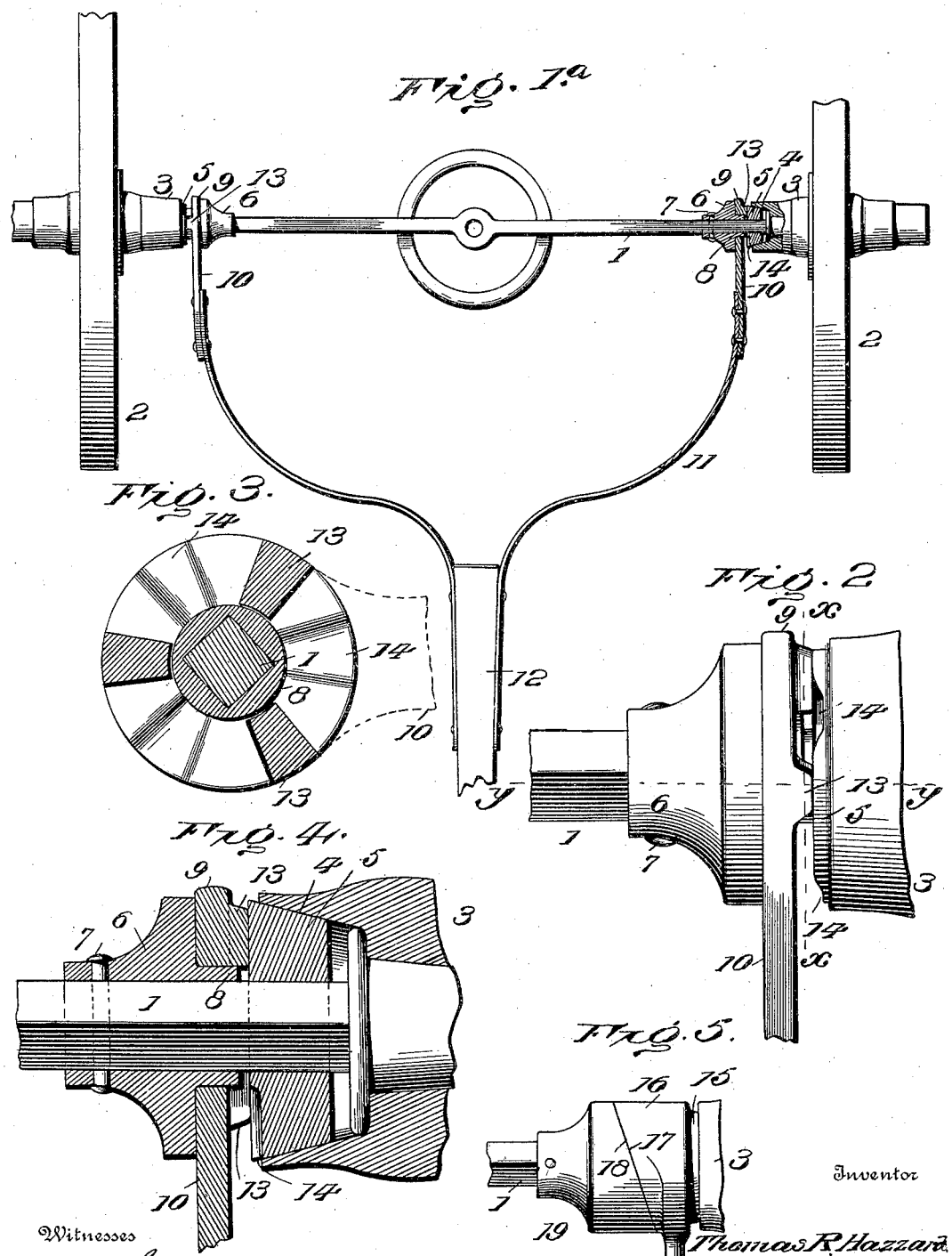

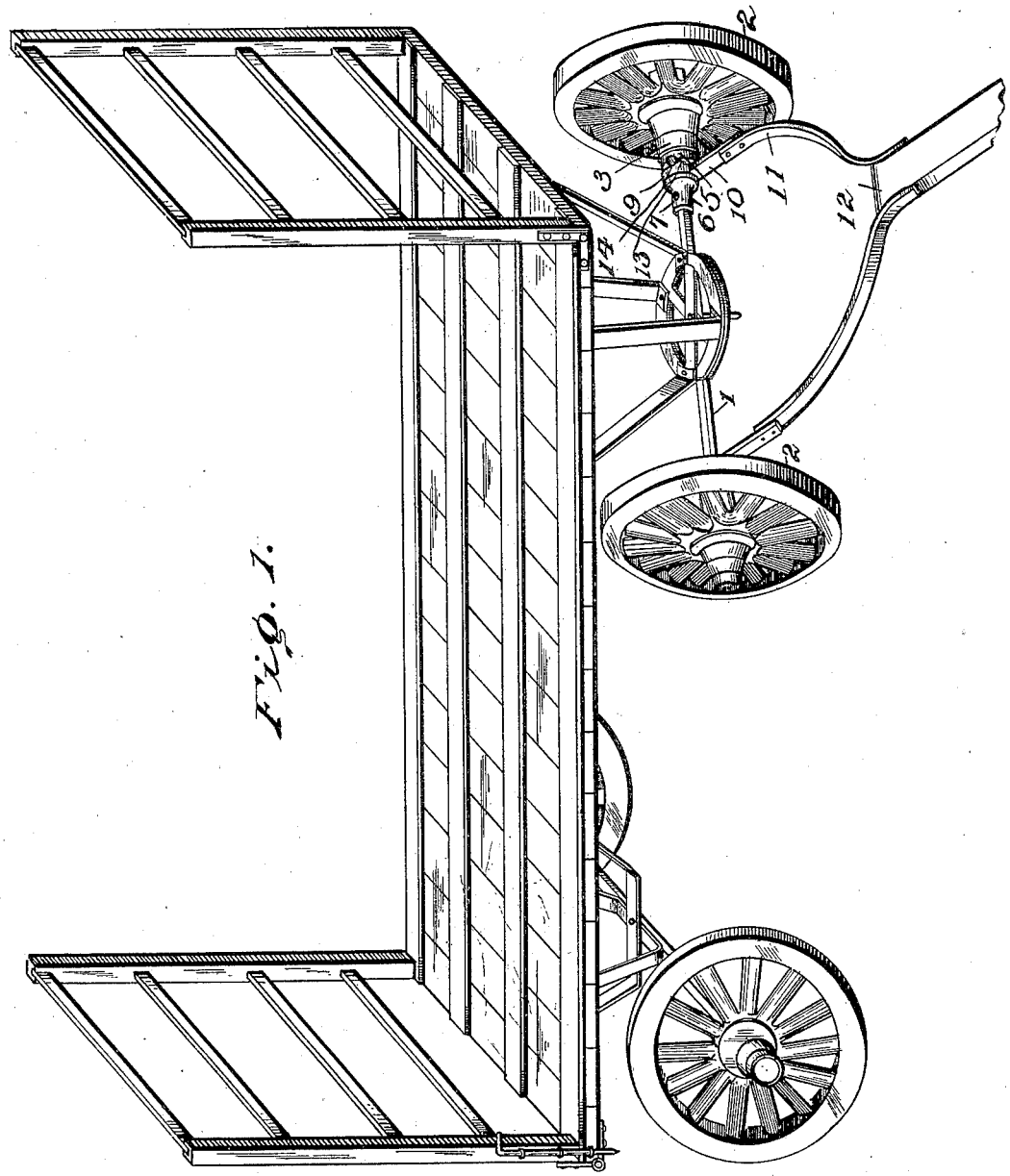

UNITED STATES PATENT OFFICE.

THOMAS R. HAZZARD, OF SIDNEY, OHIO.

TRUCK-BRAKE.

SPECIFICATION forming part of Letters Patent No. 684,638, dated October 15, 1901.

Application filed August 15, 1901. Serial No. 72,150. (No model.)

*To all whom it may concern:*

Be it known that I, THOMAS R. HAZZARD, a citizen of the United States, residing at Sidney, in the county of Shelby and State of Ohio, have invented certain new and useful Improvements in Truck-Brakes, of which the following is a specification.

My invention relates to an improvement in brakes designed to be applied to the usual baggage or other truck; and, broadly stated, it consists in the application to a truck having the usual movable handle of braking mechanism having connection with and adapted to be automatically operated in the movement of the handle.

The main object of the invention resides in the production of braking mechanism designed to be applied to the forward wheel or wheels of a four-wheeled truck and having connection with the handle thereof, the construction being such that in the normal or operative position of the handle the brake is inoperative, while the elevation or lowering of the handle will automatically set the brake and lock the wheels.

The invention further consists in certain details of construction and combinations of parts which will first be described in connection with the accompanying drawings and then pointed out in the claims.

Figure 1 of the drawings is a perspective view of a truck, illustrating the application of my invention. Fig. 1ª is a broken plan, partly sectioned, showing the forward wheels and accompanying parts of a four-wheeled truck, my invention being applied thereto. Fig. 2 is an enlarged perspective illustrating my invention. Fig. 3 is a section on line *x x* of Fig. 2. Fig. 4 is a section on line *y y* of Fig. 2. Fig. 5 is a view in elevation, illustrating a modification.

From the drawings it will be seen that my braking mechanism is applied to each of the forward wheels, and as the mechanism is identical in relation to each wheel a detailed description of but one side is deemed necessary.

Referring particularly to Figs. 1, 1ª, 2, 3, and 4, 1 represents the forward axle of a four-wheeled baggage or other truck, preferably square in cross-section and having wheels 2 of the well-known "Sarven" type suitably mounted in its ends. The hub 3 of either or both of the wheels is formed in its inner end with a wedge-shaped recess 4, with which a truncated-cone-shaped braking-block 5 is adapted to engage in the operation of braking. The braking-block is formed centrally with a square opening to fit the axle 1, thus permitting longitudinal movement of the block, but preventing its rotation. 6 represents an abutment having a central opening to conform to axle 1, to which axle it is secured by a pin 7 or other suitable means. The abutment is fixed on the axle a short distance from the braking-block and is integrally formed with a sleeve 8, which projects from the face of the abutment and is circular on the outer surface to provide a bearing for the operating-disk 9. The disk 9 is positioned between the braking-block 5 and the abutment 6 and bears against the plane face of the latter in operation, the disk being provided with an extension 10, to which is secured the iron 11 of the truck-handle 12, whereby in the movement of the handle the disk is turned on the abutment extension 8. On the outer face of the disk 9 is formed a series of projections 13, which are adapted to enter recesses 14, formed in the braking-block 5, the edges of both the projections and recesses being inclined from the vertical to permit the ready engagement and disengagement of these parts in operation. The recesses 14 are of somewhat greater width than the projections 13 in order to permit a slight movement of the projections without causing them to ride out of the recesses, for a purpose hereinafter described.

In operation, assuming the handle to be in normal or practically horizontal position, the arrangement of the parts is such that the projections 13 will rest in the recesses 14, enabling the braking-block 5 to project sufficiently from the recess 4 as not to interfere with the revolution of the wheel. By forming the recesses 14 of somewhat greater width than the projections 13, as above described, considerable latitude in movement is allowed the forward end of the handle without affecting the braking mechanism, thus providing for the natural movement of the person drawing the truck. When the handle is released either by design or accident and falls, the disk 9 is turned, causing the projections 13 to ride out of the recesses 14 and engage the plane surface of the braking-block intermediate the recesses. As the rear side of the disk works against the face of the fixed abutment 6, the above-described revolution of the disk forces the braking-block tightly into the recess 4 in the wheel-hub 3, effectively locking the wheel against movement. An exactly identical operation will be effected in the event of the handle being elevated, as will be evident, provision being made herein for the operation of the brake in the elevation of the handle, as some users of baggage-trucks require that the handle be hooked in an elevated position when the truck is stationary.

Referring now to Fig. 5, it will be seen that the braking-block 15, which is adapted to enter a recess in the wheel-hub 3, as in the above-described construction, has a plane inner surface, against which a plane surface of the operating-disk 16 bears, the inner end of the disk having an inclined surface 17, which operates against an oppositely-inclined surface 18 of a fixed abutment 19, the operation of this modification being fully apparent from the drawings. The weight of the forward end of the handle, coupled with the leverage exerted through its length, causes the braking-block in the above-described operation to be forced into the hub-recess of the wheel with great pressure, acting, as has been demonstrated in practice, as a positive lock to the wheel. By elevating or lowering the handle beyond the play allowed through the difference in size of the projections 13 and recesses 14, as above described, a braking action to a greater or less degree may be exerted upon the wheel, as will be readily understood, which effect is desirable in many situations, as when the truck is descending inclines or the like.

From the above description it will be seen that I have provided an effective braking mechanism which is operable solely by means of the handle, wherein the mere releasing or elevating of the handle instantly sets the brakes without any further act on the part of the operator, wherein the construction provides for a limited movement of the handle without affecting the braking mechanism, and wherein a braking effect to a greater or less degree may be gained by the operator by a slight movement of the handle beyond the non-affecting movement stated.

While I have herein shown and described specific forms of mechanism designed to brake the wheels, it is to be understood that I do not limit myself thereto, my invention comprehending any usual or desired form of braking mechanism having operative connection with the movable handle of a truck and automatically set or released by the movements of such handle.

Having thus described my invention, what I claim as new, and desire to secure by Letters Patent, is—

1. In combination with a wheeled truck having a handle movably mounted on the axle, of braking mechanism capable of sliding movement only with relation to the wheels, and means directly connected with the handle for operating said braking mechanism in movement of the handle.

2. In combination with a truck having a handle movably mounted on the axle, of braking mechanism, and means directly connected with the handle adapted to contact with and move said mechanism to braking position in operation of the handle, said means being arranged to permit a slight movement of the handle beyond the normal without affecting the braking mechanism.

3. In combination with a truck having a handle pivoted on the truck-axle, of braking mechanism mounted on the axle adjacent the handle and capable of lateral movement only, said mechanism being directly operative through elevation or lowering of the handle and being unaffected by slight movements of the handle beyond the normal position.

4. In combination with a truck having a handle pivoted on the axle, of braking mechanism, and means integral with the pivoted end of the handle and in contact with the braking mechanism, whereby said mechanism is set by the elevation or lowering of the handle and rendered inoperative when the handle is in normal position.

5. In combination with a truck having a handle pivotally mounted on the axle, of a braking-block adapted for coöperation with the wheel-hub, said block being supported on the axle to permit a lateral movement only, and means directly connected with the handle to move said block into operative position by the elevation or lowering of the handle.

6. In a truck having an axle and wheels mounted thereon, a handle pivotally mounted on the axle, a braking-block adapted for coöperation with the wheel-hub, an abutment fixed on the axle, a disk intermediate the abutment and block and adapted to move the block to engage the hub, said disk being directly connected with the handle and operated through movement of the handle.

7. In a truck having an axle and wheels mounted thereon, a handle pivotally mounted on the axle, a braking-block adapted to engage a recess formed in the wheel-hub, an abutment fixed on the axle, a disk intermediate the abutment and block and adapted to move the latter, said disk having direct connection with the handle, and means to permit a slight movement of the disk without moving the braking-block.

8. In a truck having an axle and wheels mounted thereon, a handle pivotally mounted on the axle, a braking-block adapted to engage a recess formed in the wheel-hub, said block being formed on its inner surface with recesses, an abutment fixed on the axle, a disk intermediate the abutment and block and formed on its face contiguous the block with projections normally resting in the recesses in the block, said disk being directly connected with the pivoted end of the handle and operable in the movement of the handle.

9. A brake for trucks comprising a block adapted for coöperation with the wheel-hub, an abutment fixed on the axle of the truck, a disk intermediate the abutment and block, projections formed on the disk and adapted to enter recesses formed in the block, said recesses being of greater width than the projections, and the truck-handle pivotally mounted on the truck-axle, said disk being integral with the pivoted end of the handle.

In testimony whereof I affix my signature in presence of two witnesses.

THOMAS R. HAZZARD.

Witnesses:
J. D. BARNES,
F. M. ROBERTS.